US010169937B1

(12) United States Patent
Zwink et al.

(10) Patent No.: US 10,169,937 B1
(45) Date of Patent: Jan. 1, 2019

(54) SYSTEMS AND METHODS FOR MULTIFACTOR PHYSICAL AUTHENTICATION

(71) Applicant: JPMorgan Chase Bank, N.A., New York, NY (US)

(72) Inventors: Robert V. Zwink, Columbus, OH (US); Alex Lieberman, Marlboro, NJ (US); Chip Bell, Bexley, OH (US); Simon R. Hobson, Bournemouth (GB)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 15/298,328

(22) Filed: Oct. 20, 2016

(51) Int. Cl.
| | |
|---|---|
| *G05B 19/00* | (2006.01) |
| *G07C 9/00* | (2006.01) |
| *G06F 21/31* | (2013.01) |
| *H04L 29/06* | (2006.01) |
| *G06F 21/34* | (2013.01) |

(52) U.S. Cl.
CPC ......... *G07C 9/00039* (2013.01); *G06F 21/31* (2013.01); *G06F 21/34* (2013.01); *H04L 63/083* (2013.01); *G06F 2221/2103* (2013.01); *G06F 2221/2113* (2013.01); *H04L 2463/082* (2013.01)

(58) Field of Classification Search
CPC ................................................ G07C 9/00039
USPC .......................................................... 340/5.6
See application file for complete search history.

(56) References Cited

U.S. PATENT DOCUMENTS

| 7,979,894 | B2 * | 7/2011 | Royyuru ................. G06F 21/31 726/2 |
| 9,280,559 | B1 * | 3/2016 | Jones ................... H04L 61/1582 |
| 2008/0049988 | A1 * | 2/2008 | Basile ................ G07C 9/00158 382/124 |
| 2010/0281513 | A1 * | 11/2010 | Richards ............... G06F 21/604 726/1 |
| 2012/0304261 | A1 * | 11/2012 | Justice ................. G06Q 10/107 726/5 |
| 2014/0298432 | A1 * | 10/2014 | Brown .................. H04L 63/083 726/6 |
| 2015/0141076 | A1 * | 5/2015 | Libin .................... H04W 4/003 455/557 |
| 2015/0180829 | A1 * | 6/2015 | Yu .......................... G06F 21/31 726/11 |
| 2016/0259935 | A1 * | 9/2016 | Goldberg ................ G06F 21/45 |
| 2016/0359986 | A1 * | 12/2016 | Jones ..................... H04L 67/18 |
| 2016/0360360 | A1 * | 12/2016 | Jones ..................... H04W 4/021 |

(Continued)

*Primary Examiner* — Santiago Garcia
(74) *Attorney, Agent, or Firm* — Hunton Andrews Kurth LLP

(57) ABSTRACT

Systems and methods for multifactor physical authentication are disclosed. In one embodiment, a method for accessing an entitlement at a facility using multifactor physical authentication may include (1) receiving, at a first electronic interface at a facility, an individual identifier from an individual; (2) at least one computer processor presenting a challenge to the individual; (3) the at least one computer processor receiving, at a second interface, a response to the challenge; (4) the at least one computer processor authenticating the individual based on the individual identifier and the response; (5) the at least one computer processor retrieving at least one authorized entitlement associated with the individual identifier; and (6) the at least one computer processor activating the entitlement at the facility associated with the authorized entitlement.

20 Claims, 2 Drawing Sheets

(56) References Cited

U.S. PATENT DOCUMENTS

2017/0053280 A1* 2/2017 Lishok ............... G06Q 20/4014
2017/0104740 A1* 4/2017 Hoy ........................ H04L 63/08
2017/0109518 A1* 4/2017 Matsuura ............ G06F 21/6218
2017/0249793 A1* 8/2017 Drako ................ G07C 9/00309

* cited by examiner

SYSTEMS AND METHODS FOR MULTIFACTOR PHYSICAL AUTHENTICATION

BACKGROUND OF THE INVENTION

1. Field of the Invention

The present disclosure generally relates to systems and methods for multifactor physical authentication.

2. Description of the Related Art

Organizations typically issue their employees RFID or magnetic stripe access badges. These badges may provide access to different areas in an office (e.g., building floors, office space, records rooms, computer rooms, etc.), equipment (e.g., computers, printers, copiers, fax machines, etc.), etc. Because these badges often transmit a unique identifier that is associated with an employee, they generate access events as employees go about their everyday business.

SUMMARY OF THE INVENTION

Systems and methods for multifactor physical authentication are disclosed. In one embodiment, a method for accessing an entitlement at a facility using multifactor physical authentication may include (1) receiving, at a first electronic interface at a facility, an individual identifier from an individual; (2) at least one computer processor presenting a challenge to the individual; (3) the at least one computer processor receiving, at a second interface, a response to the challenge; (4) the at least one computer processor authenticating the individual based on the individual identifier and the response; (5) the at least one computer processor retrieving at least one authorized entitlement associated with the individual identifier; and (6) the at least one computer processor activating the entitlement at the facility associated with the authorized entitlement.

In one embodiment, the entitlement may be access to a computer network at the facility. The method may further include the at least one computer processor deactivating access to the computer network from outside the facility in response to activating access to the computer network at the facility.

In one embodiment, the method may further include the at least one computer processor writing the activation to a distributed ledger.

In one embodiment, the first interface and the second interface may be the same.

In one embodiment, the challenge may be presented on an electronic device associated with the individual.

In one embodiment, the entitlement may be electricity at a portion of the facility, HVAC at a portion of the facility, etc.

In one embodiment, the entitlement may be access to a password vault, and the method may further include the at least one computer processor retrieving at least one password from the password vault; and the at least one computer processor entering the password into a web form.

In one embodiment, the individual identifier may be received from one of a token or an electronic device.

According to another embodiment, a system for accessing an entitlement at a facility using multifactor physical authentication may include a facility comprising: a first electronic interface; a second electronic interface; a plurality of electronic devices, each device associated with an entitlement; a database storing a plurality of individual identifiers, each individual identifier associated with an authorized entitlement; and at least one computer processor in communication with the first electronic interface, the second electronic interface, and the plurality of electronic devices. The first electronic interface may receive an individual identifier from an individual. The computer processor may present a challenge to the individual. The second electronic interface may receive a response to the challenge. The at least one computer processor may authenticate the individual based on the individual identifier and the response, may retrieve at least one of the authorized entitlements based on the individual identifier; and may activates the entitlement at the facility associated with the authorized entitlement.

In one embodiment, the entitlement may be access to a computer network at the facility. The method may further include the at least one computer processor deactivating access to the computer network from outside the facility in response to activating access to the computer network at the facility.

In one embodiment, the method may further include the at least one computer processor writing the activation to a distributed ledger.

In one embodiment, the first interface and the second interface may be the same.

In one embodiment, the system may further comprise an electronic device associated with the individual, and the challenge may be presented on the electronic device.

In one embodiment, the entitlement may be electricity at a portion of the facility, HVAC at a portion of the facility, etc.

In one embodiment, the system may further include a password vault. The entitlement may be access to a password vault, and the method may further include the at least one computer processor retrieving at least one password from the password vault; and the at least one computer processor entering the password into a web form.

In one embodiment, the system may further include at least one token that stores the individual identifier.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
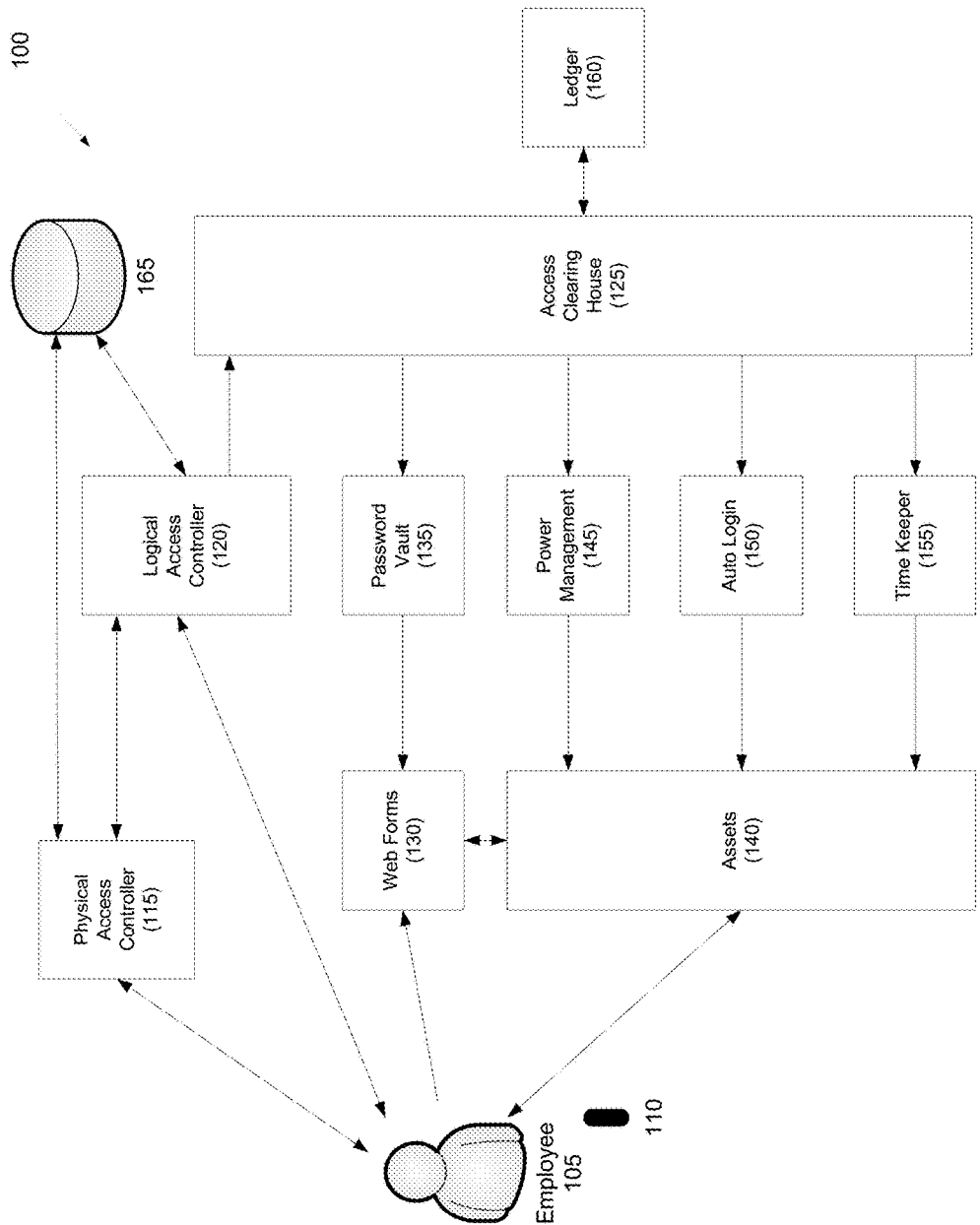
FIG. 1 depicts a system for multifactor physical authentication according to one embodiment.
Figure 2:
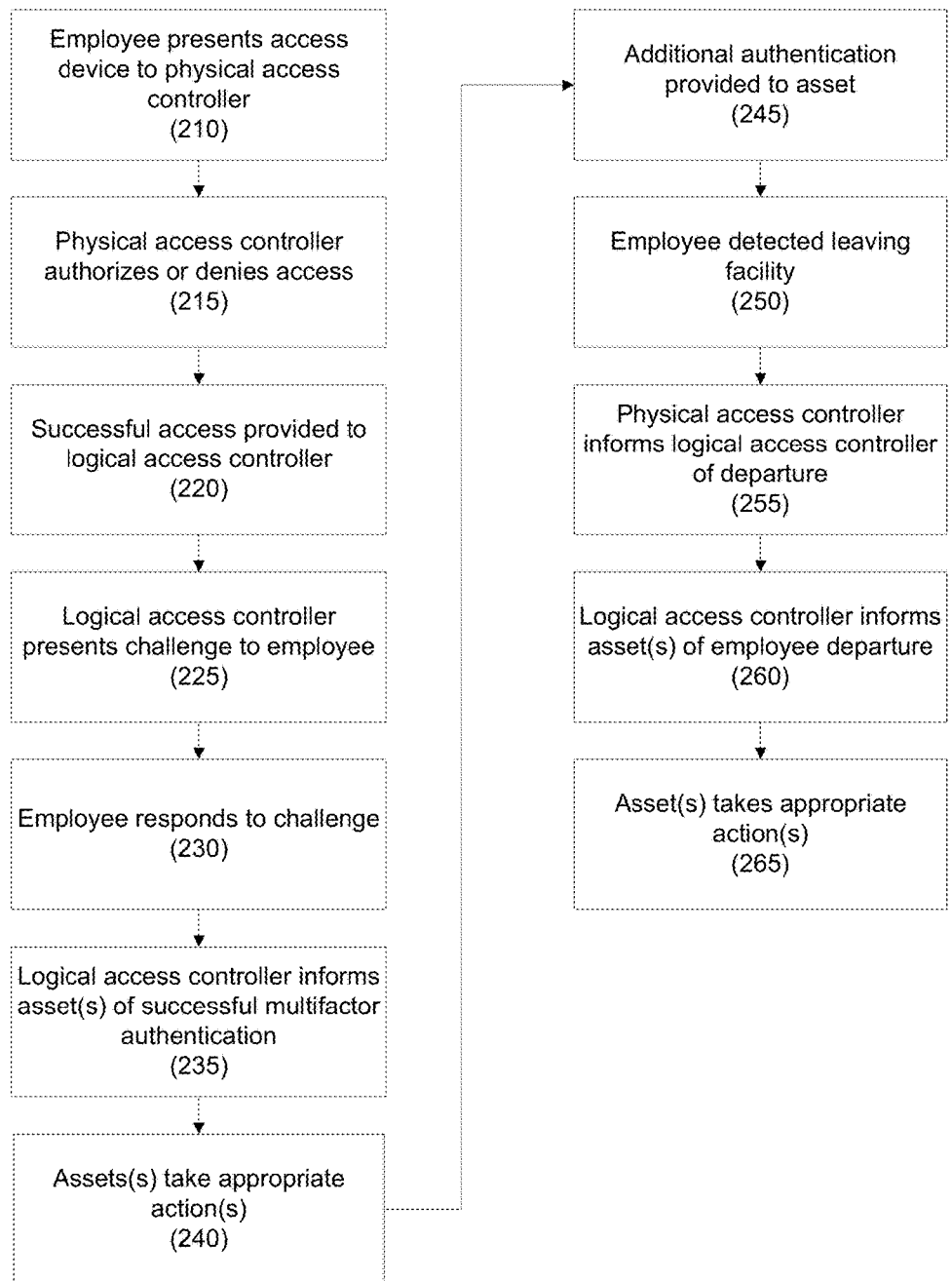
FIG. 2 depicts a method for multifactor physical authentication according to one embodiment.

Several embodiments of the present invention and their advantages may be understood by referring to FIGS. 1-2.

Embodiments disclosed here are related to multifactor physical authentication. In one embodiment, the access events may be leveraged for greater efficiency, improved productivity, and enhanced levels of security. For example, embodiments may integrate physical access with multifactor authentication, password vault integration, and mechanisms to conserve power through the integration of these enhanced access controls.

In one embodiment, a system may cover access to any physical device with authentication features including, for example, doors, turnstiles, lockers, telephones, computers and other related hardware, etc. In one embodiment, authentication to the physical device may be a first access point to a logical access controller, or it may be a subsequence access point that does not require multi-factor authentication. For example, an employee may be authenticated using multi-factor authentication upon entering a "front door" (e.g., access to the facility, secure area, etc.), and only need a single authentication point to access a floor.

In one embodiment, the system may maintain authentication workflows that identify proper order to authentication attempts. For example, when an employee comes into work, the employee may be required to have a proper authentication at the front door before the employee can authenticate at any assets within the building. Conversely, any attempt to authenticate a remote device on a remote network (e.g., a computer attempting to access an internal computer network from outside the facility) may be rejected while the employee is currently authenticated to, or has recently authenticated to, an asset within the facility.

First access authentication via physical control authentication may include a digital signature that may be associated with an employee via any machine readable device, such as via NFC, RFID, Bluetooth, WiFi, ZigBee, etc. Machine readable devices may include key fobs, smartphones, embedded cards, etc. First access authentication to a physical controller may alternatively incorporate biometric identification including, but not limited to fingerprints, facial recognition, voice recognition, iris recognition, etc.

In one embodiment, smart contracts may be used to check employee authorizations and entitlements. For example, a smart contract may specify authorized hour during which the employee can be physically present at a facility, authorized areas within the facility, authorized equipment for the employee to use, authorized computer networks, etc.

In one embodiment, the smart contracts may be stored in a database, and may receive incoming data related to employee access. In one embodiment, if an attempt is made to access an unauthorized area with the employee's device, the smart contract may prevent such access.

Once an employee has entered a physical site and provided a first access authentication, the employee may make subsequent authentication attempts to assets, including physical assets and digital assets. The timing between accesses may be used as an authentication factor as may be the historical pattern of authentication via machine learning. For example, an employee who confirms authentication at the front door and always heads to the third floor, but instead tries to authenticate on a high security floor may raise an alert, trigger a notification, etc.

Any of the first access authentications may be coupled with a secondary authentication factor, which may include a different first access authentication, or a digital authentication (log in at a terminal or any other internet connected device) or an out-of-band authentication factor to a wireless device (e.g., a smartphone) in the form of either a phone call, text, or mobile data to app response. Out-of-band authentication may include entry of a PIN, a RSA token value, voice or facial recognition, or a simple response from a fingerprinted device.

If the employee does not access the logical access controller via a physical method first (e.g., the employee's last recorded event was leaving a facility) and the employee is working remotely, the first access point will be via a digital stream such as a remote login. In this event, a secondary authentication factor may be used, such as out-of-band authentication.

For example, an employee may enter an area by presenting an access device to a turnstile. The system may then provide a request for the employee to validate that the access occurred via a keypad (e.g., a keypad at the turnstile), a registered mobile electronic device (e.g., smartphone), etc., or web by entering a secret PIN, code, etc. Such validation may create a multi-factor verification for the purpose of verifying an employee's location.

In one embodiment, an access clearing house may record authentication attempts and commit them to a ledger, such as a ledger (e.g., a blockchain ledger). An example is the Ethereum platform, which may also incorporate smart contract functionality. In one embodiment, the ledger may be a centralized ledger; in another embodiment, the ledger may be distributed and maintained by each area, part of a floor, floor, building, campus, etc.

In another embodiment, the authentication attempts and/or employee restrictions may be stored in one or more database.

Additional information, such as timestamps, type of authentication, location information, IP addresses, etc. may be associated and stored with the authentication attempts. In one embodiment, machine learning and pattern recognition may be used to identify any variances from a standard pattern for an employee. In one embodiment, the system may identify and derive average times between various physical access controllers in order to ensure that an employee does not attempt to authentication in two locations at once or within an improbably short time, both of which may indicate fraud.

For example, if a user is currently authenticated in a remote session from outside a physical facility, the access clearing house may not approve authentications to a physical location at that time, nor will it allow authentications to digital services from locations within the physical facility.

In one embodiment, a password vault and web form service may be provided. Following a successful multi-factor authentication for an employee, the access clearing house may allow access to a password vault. The password vault may be used to store plaintext or encrypted passwords. In one embodiment, passwords that of a complexity that are beyond the scope of brute force attempts—such as 128 or 256 character passwords for access to a system—may be used.

In one embodiment, to access the password vault, the user may be required to enter a password at, for example, an Internet-connected device. The password may incorporate one or more token (e.g., a RSA token) or other tokens acquired from out of band channels.

In one embodiment, passwords may be provided on a hard token that may interface with a computing device using, for example, a USB port. The computing device may read a token value using software and may match it against a value in a database to determine access. In one embodiment, the values may periodically change.

In one embodiment, passwords that are stored in the password vault may be self-updating. For example, the passwords may be changed periodically, randomly, by a trigger event, on demand, etc. In one embodiment, the passwords may be cycled to a new password that has already been generated; in another embodiment, the passwords may be replaced with newly-generated passwords.

In one embodiment, the system may automatically update any websites, security protocols, etc. that are registered to for a password in the password vault with the new password. In another embodiment, the websites may be updated in batch, in batches by roles, dates, etc. In another embodiment, the passwords may be synchronized between the vault and the end user system an algorithm by time, upon request, in response to a lockout, etc.

In one embodiment, embodiments may replace or supplement the standard single sign on ("SSO") process. For example, when developing a new account, the access clearing house may communicate directly with the application to create a new password with little, or no, user involvement. In one embodiment, the password may be associated with, for example, a website, and may be written or stored as a block in the ledger.

In one embodiment, the access clearing house may access software on a computing device, terminal, etc. to verify that the user is authenticated in the user's ledger. Once verified, the software may auto-complete, for example, a web form with a password that may be tied to, or associated with, a block that is associated with the website. In another embodiment, the website may use an API to access the block chain, and the user may be identified using, for example, a standard identification, such as a user name and password, on the user's first registration. In one embodiment, the API may facilitate the first registration, but that registration may not provide access to the website.

In one embodiment, the website may be automatically provided with the block ID or any other suitable block identifying feature, such as a private key via, for example, web form. In one embodiment, the private key may be accessible only once authenticated into the block. The website may generate identifier information for the user's block that may be unique to the website, and may request a password or may provide a password to the block using this identifier information.

In one embodiment, the user may create a standard username and may identify the user's public or private block identifier. This may be performed automatically using, for example, form completion, or by manual submission. The website may then use the username to identify the user on the website, but may follow the protocols disclosed above or other suitable means for creating passwords. The username may or may not be registered in the block. If it is not registered in the block, the username may, for example, act as a hash to access the unique identifier in the block for the site and the authenticated block may return the password after it is retrieved.

In another embodiment, users may be registered in bulk based on public block chain identifiers. These users, however, may not receive access or considered to be registered users unless prior authentication exists in their respective block(s).

In one embodiment, features of the authentication may include each website having access to the block chain via API or other stream; a website may generate a static or unique identifier key for itself for insertion into a user's block; a mapping of a unique user id (UUID) for the user's block and vice versa may be stored; a user may have a unique identifier key (UUID, random characters, etc.); a user's unique identifier key may include very long password of random characters; a user's block may store the password in the unique user identifier under the unique website identifier; the user may also have a username in that may be stored by the website and hashes to the user UUID; etc.

In one embodiment, for a user to access a website using a username, the website may store the unique or static key for a user's block in a hash of the username. The user may enter the username manually. The UUID (or static key) for the website may be retrieved for the unique user and may be sent to the users block. The user's block may use this site UUID as a key to access a UUID for user, and may send it via the backend to the website, activating access to the website for the UUID of user for a certain period of time. The block may check authentication and access of the user terminal of the block and if correct, sends the password for this UUID to the terminal. Alternatively, the password may be sent by a backend directly to website with terminal information. If there is no backend, the terminal may use the password via form completion or display to access user UUID and authenticate the username for use.

In one embodiment, the user may access a website without using a username. For example, the user may be logged into at a terminal, and the block may be aware of the traffic of the terminal and identifies identity of site. The block may access the identity of site to access the user's username and password, and may auto fills this information into the website. Alternatively, the backend may send the username and password sends directly to website and website may logs the user in.

Next, the access may be confirmed. For example, if user one tries to register an account for user two in a new system, user two may receive a new account if none existed, but since user one has not authenticated himself as user two, user one will not have access. Other embodiments may simply include registering a new account with out-of-band authentication (email, text, mobile data, etc.), by requesting access to a site via a Request Control Center which interacts via API and does not ever involve the user in additional manual enrollment, etc.

In one embodiment, a database and/or the access clearing house may have a record of the assets (e.g., phone, computer, printer, lighting, HVAC, etc.) the employee may access (e.g., the equipment within the employee's office, cubical, etc.). In one embodiment, the system may access and control lighting, HVAC, and others systems. Power for individual assets, such as computers, monitors, printers, etc., may be controlled by power strips that may have network connectivity (wired or wireless) and control over individual socket power. In one embodiment, the power strips may also communicate with other connected devices that may assist in the power on/off process (e.g., Low Energy Bluetooth).

In one embodiment, the system may use machine learning and authentications to determine when to intelligently power on and off assets. For instance, when an employee departs the facility, the employee's computer, monitor, phone, lighting, etc. may be powered down. If the system has identified a pattern that the employee arrives at 9:00 AM each workday, the system may automatically power on in anticipation of arrival, and may power off if no authentication is received (indicating that the employee is not present at the facility).

In one embodiment, the system may interface with the employee's electronic calendar to identify times when the employee may not be present at the facility (e.g., travel, vacation, etc.).

In one embodiment, the system may identify when an employee has entered an area where the employee is registered to work. This may be, for example, by the employee presenting a badge, a mobile electronic device, etc. to an access control point. Once the employee is identified, the system may trigger one or more authenticate feature at the employee's workstation to automatically log in. For example, these authentication features may include face or voice recognition, out of band location via a fingerprinted smartphone or other mobile device, Bluetooth, RFID, other close proximity device, etc.

In one embodiment, the workstation may not automatically unlock, but form fields may be pre-populated.

Similarly, the employee's computer may also auto lock when the moves, for example, a token, card, etc. outside of a predetermined distance of the employee's computer, workstation, etc. In another embodiment, the employee's computer may auto lock if the employee's face is no longer recognized, if an additional face is detected, etc. An example is disclosed in U.S. patent application Ser. No. 13/032,952, the disclosure of which is hereby incorporated, by reference, in its entirety.

In one embodiment, biometric data may be distributed as a number of portions. For example, for a face biometric, multiple facial characteristics may be analyzed for a match. These facial characteristics may be divided into a number of elements, and each element may be stored on a different system and identified by a pointer. Thus, if a database storing a facial characteristic is compromised, the entire facial biometric is not compromised.

In one embodiment, the biometric portions may include a pointer to a subsequent biometric portion. Thus, once a biometric portion is a authenticated, the next biometric portion, which may be stored on a different system, may be analyzed.

Referring to FIG. 1, a system for multifactor physical authentication is disclosed according to one embodiment. System 100 may include employee 105 that may be in possession of access device 110. Access device 110 may be any suitable access device, including cards, tokens, etc. In one embodiment, access device 110 may be RF enabled.

In other embodiment, access device 110 may communicate using Bluetooth Low Energy ("BLE") tags, NFC, WiFi, combinations thereof, or any other suitable mechanism.

In one embodiment, access device 110 may include a machine-readable optical code (e.g., a bar code, QR code, etc.). In still another embodiment, access device 110 may include a magnetic stripe.

In one embodiment, access device 110 may be provided as part of a mobile electronic device (not shown), such as a smartphone, tablet computer, etc. In one embodiment, access device 110 may communicate using the mobile electronic device.

Any combinations of the above may be used as necessary and/or desired.

Access device 110 may interface with physical access controller 115, which may read a unique identifier from access device 110. In one embodiment, physical access controller 115 may be a RF reader, optical reader, magnetic stripe reader, biometric reader, etc.

In one embodiment, logical access controller 120 may interface with employee 105. In one embodiment, logical access controller 115 may include a user interface, such as a keypad, touch pad, joy stick, biometric sensor, etc. In one embodiment, logical access controller 120 may receive a biometric, a PIN, a password, a username, etc.

In one embodiment, physical access controller 115 and logical access controller 120 may be provided as the same device. In one embodiment, physical access controller 115 and logical access controller 120 may communicate with each other.

In one embodiment, logical access controller 120 may interface with access clearing house 125. In one embodiment, access clearing house 125 may receive data from physical access controller 115 and/or logical access controller 115. In one embodiment, access clearing house 125 may authenticate employee 105; in another embodiment, access clearing house 125 may receive authentication approval from physical access controller 115 and/or logical access controller 115, from an external system (not shown), etc.

In one embodiment, access clearing house 125 may submit access data to ledger 160, which may be a blockchain-type of ledger. In one embodiment, a single, centralized ledger 160 may be provided. In another embodiment, ledger 160 may be distributed. For example, each unit (e.g., access area, part of a floor, floor, building, campus, etc.) may maintain its own copy of ledger 160 as is necessary and/or desired.

In one embodiment, ledger 160 may maintain smart contracts. In one embodiment, the smart contract may be fully or partially self-executing and/or self-enforcing In one embodiment, access clearing house 125 may communicate employee 105's current authentication status, current location, etc. to password vault 135, power management 145, auto login 150, time keeper 155, assets 140 (e.g. computers, lights, HVAC, computer networks, etc.), etc. For example, password vault 135 may store one or more of employee 105's passwords. Example of suitable password vaults 135 include "1Password" and "KeePass."

Power management 145 may manager the power to assets 140. Power management 145 may be hardware and/or software based. Individual controllers (not shown) may control power to assets 140 at the electrical outlet, or may provide software control within assets 140 (e.g., commanding a computer to shut down, sleep, hibernate, etc.).

Auto Login 150 may be provided as hardware and/or software that may retrieve password data from password vault 135 and enter some or all of that password data into web form 130 for logging in to assets 140 (e.g., a computer), an account, etc.

Time keeper 155 may provide time clock in/out functionality for employee 105.

Assets 140 may include telephones, computers (e.g., workstations, desktop computers, laptop computers, terminals, etc.), lights, HVAC systems, copiers, printers, computer networks, etc.

One or more database 165 may be provided. Database(s) 165 may store, for example, unique identifiers, whitelists, blacklists, biometric data, etc. In one embodiment, biometric data may be stored as a plurality of portions and may be stored in a plurality of databases.

For example, the main receiver of the biometric data (e.g., a primary database, an electronic device, a ledger, etc.) may not store any of the biometric data. Instead, it may store one or more locations(s) of servers, databases, etc. where the biometric data may be stored, and may split the received biometric data into a plurality of "pieces" or files, and may distribute the files to one or more of the locations. In one embodiment, the servers, databases, etc. at the location may hash the portion that they received in a HashTable that may retrieve a portion of an access key that is sent back to the main receiver. The main receiver may combine the access key portions into one access key for access, and may store that key. In one embodiment, the access key may be the key to, for example, the employee smart contract.

Referring to FIG. 2, a method for multifactor physical authentication is disclosed according to one embodiment.

In step 210, at a point of entry to a facility, floor, secure area, etc., an employee may present an access device to a physical access controller. As discussed above, any access device that may present a unique identifier to the physical access controller may be used, including cards, tokens, mobile electronic devices, etc.

In one embodiment, the employee may present a unique identifier, such as an employee identification number, to the physical access controller using a user interface such as a keypad, voice recognition, etc.

In step 215, the physical access controller may decision whether or not to approve the unique identifier. In one embodiment, the physical access controller may use a whitelist, a blacklist, etc. to determine whether or not to approve access.

In one embodiment, the physical access controller may consider external activities in decisioning. For example, if the employee associated with the unique identifier is accessing a computer network from outside the facility, access may be denied, notifications may be provided, or additional authentication may be required for one or both of the physical access and the remote network access.

In step 220, the physical access controller may inform a logical access controller of a successful identification. In one embodiment, this may be performed asynchronously.

In step 225, the logical access controller may present a challenge to the employee. For example, the logical access controller may request the employee to enter a PIN, a passphrase, a biometric (e.g., voice, facial, fingerprint, etc.). In one embodiment, the challenge may be presented at the point of entry. In another embodiment, the challenge may be presented using a device registered to the unique identifier received by the physical access controller (e.g., out-of-band authentication using the employee's smartphone, tablet computer, telephone, etc.).

In step 230, the employee may respond to the challenge by entering the requested information. The employee may respond using the same device on which the challenge was presented, on a different device, etc.

In one embodiment, each authentication attempt may be written to the ledger, along with the result (e.g., pass or fail). In one embodiment, access and/or activity may be written periodically during the period in which the user is authenticated.

In one embodiment, the physical access controller and/or the logical access controller may access a smart contract to determine if the access should be approved. The smart contract may retrieve, for example, employee activity from the ledger and may determine whether the requested action is inconsistent with any previous action, or with any authorized activity.

In addition, the smart contract may terminate any unauthorized, inconsistent, or additional authentication. For example, if the user is present at a facility, the smart contract may terminate the user's external network connection.

In step 235, the logical access controller may inform one or more assets that the employee has undergone successful multifactor authentication.

In step 240, one or more assets may take an action based on the successful multifactor authentication. One or more of the following actions may be taken: the password vault may fill in web forms; power may be provided to assets (e.g., lights, computer, workstation, terminal, printer, HVAC, etc.); phones, workstations, computer terminals, etc. may be logged in; time clocks may be enabled; employees may use complex passwords; etc.

In one embodiment, assets may be prohibited from taking any action inconsistent with the employee's physical presence at the facility. For example, if the employee is present at the facility, additional attempts to enter the facility using the unique identifier may be denied, attempts to access the computer network from outside the facility may be denied, etc.

In step 245, if any asset(s) require additional authentication (e.g., the presence of a RFID badge within a predetermined distance of a computer, the sensing of the employee's face, sensing of a temperature indicating the presence of a human at the computer or in the office or area, movement in an office or area, etc.), the assets may require that additional authentication and/or authorization prior to being activated.

In step 250, when the employee leaves via the point of entry, the employee may present his or her access device to the physical access controller. In another embodiment, the employee may be detected as leaving via the point of entry using biometrics (e.g., face recognition). Other means for detecting the employee's departure, such as receiving the GPS location of the employee's mobile device, exiting a garage or building using an access card, being logged out of systems for a period of time, etc. may be used as necessary and/or desired.

In step 255, the physical access controller may inform the logical access controller that the employee has departed the facility. It may further inform the failure, success, or degree of success of biometric authentication, the session length, the number of current open sessions in the system, the time since last activity, etc.

In step 260, the logical access controller may inform one or more assets of the employee's departure.

In step 265, the one or more assets may take an action based on the employee's departure. For example, one or more of the following actions may be taken: the password vault may no longer be authorized to fill in web forms; power may be discontinued to assets (e.g., lights, computer, workstation, terminal, printer, HVAC, etc.); phones, workstations, computer terminals, etc. may be logged out; time clocks may be disabled; employees may not access the password vault to retrieve passwords; etc.

In one embodiment, assets may be prohibited from taking any action inconsistent with the employee's departure from the facility. For example, attempts from within the facility to log on to computers using the employee's credentials may be denied, attempts to access other areas within the facility using the employee's unique identifier may be denied, etc.

In one embodiment, as the employee takes different actions (e.g., authenticates using the access device, accesses/exits a network, accesses/exits an area, etc.), the activity may be written to the ledger. Other data, such as date and time, type of secondary authentication presented, location, etc. may be stored as is necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for accessing an entitlement at a facility using multifactor physical authentication, comprising:
   receiving, at a first electronic interface for a physical access controller at a facility that controls physical access to an area within the facility, an individual identifier from an individual;
   at least one computer processor presenting an authentication challenge to the individual;
   the at least one computer processor receiving, at a second electronic interface for the physical access controller at the facility, a response to the authentication challenge;
   the at least one computer processor authenticating the individual based on the individual identifier and the response to the authentication challenge;
   the at least one computer processor retrieving at least one authorized facility entitlement that provides access to a resource associated with the facility that is associated with the individual identifier; and
   the at least one computer processor activating the facility entitlement at the facility associated with the authorized entitlement.

2. The method of claim 1, wherein the resource comprises a computer network.

3. The method of claim 2, further comprising:
   the at least one computer processor deactivating access to the computer network from outside the facility in response to activating access to the computer network at the facility.

4. The method of claim 1, further comprising:
   the at least one computer processor writing the activation of the facility entitlement as an entry in an electronic, immutable, cryptographically-verifiable ledger.

5. The method of claim 1, wherein the first interface and the second interface are the same.

6. The method of claim 1, wherein the authentication challenge is presented on an electronic device associated with the individual.

7. The method of claim 1, wherein the resource comprises electric power at a portion of the facility.

8. The method of claim 1, wherein the resource comprises HVAC at a portion of the facility.

9. The method of claim 1, wherein the resource comprises access to a password vault, and the method further comprises:
   the at least one computer processor retrieving at least one password from the password vault; and
   the at least one computer processor entering the password into a web form.

10. The method of claim 1, wherein the individual identifier is received from one of a token or an electronic device.

11. A system for accessing an entitlement at a facility using multifactor physical authentication, comprising:
   a facility comprising:
     a physical access controller at the facility comprising a first electronic interface and a second electronic interface;
     a plurality of electronic devices, each device associated with an entitlement;
     a database storing a plurality of individual identifiers, each individual identifier associated with an authorized facility entitlement that provides access to a resource associated with the facility; and at least one computer processor in communication with the first electronic interface, the second electronic interface, and the plurality of electronic devices, wherein:

the first electronic interface receives an individual identifier from an individual;

the at least one computer processor presents an authentication challenge to the individual;

the second electronic interface receives a response to the authentication challenge;

the at least one computer processor authenticates the individual based on the individual identifier and the response to the authentication challenge;

the at least one computer processor retrieves at least one of the authorized facility entitlements based on the individual identifier; and the at least one computer processor activates the facility entitlement at the facility associated with the authorized entitlement.

12. The system of claim 11, wherein the resource comprises a computer network.

13. The system of claim 12, wherein the at least one computer processor deactivates access to the computer network from outside the facility in response to activating access to the computer network at the facility.

14. The system of claim 11, wherein the at least one computer processor writes the activation as an entry in an electronic, immutable, cryptographically-verifiable.

15. The system of claim 11, wherein the first interface and the second interface are the same.

16. The system of claim 11, further comprising:
an electronic device associated with the individual;
wherein the authentication challenge is presented on the electronic device.

17. The system of claim 11, wherein the resource comprises electric power or HVAC at a portion of the facility.

18. The system of claim 11, further comprising:
a password vault that stores a plurality of passwords; and
wherein the resource comprises access to the password vault; and
wherein the at least one computer processor retrieves at least one of the passwords from the password vault and enters the password into a web form.

19. The system of claim 11, further comprising:
at least one token that stores the individual identifier.

20. The system of claim 11, further comprising an electronic, immutable, cryptographically-verifiable ledger, and wherein the at least one computer processor writes the activation of the facility entitlement as an entry in the electronic, immutable, cryptographically-verifiable ledger.

* * * * *